United States Patent [19]

Evans et al.

[11] 4,064,194

[45] Dec. 20, 1977

[54] HIGH SOLIDS URETHANE COATINGS

[75] Inventors: James M. Evans, Olmsted Falls; Donald R. Stevenson, Brunswick, both of Ohio

[73] Assignee: SCM Corporation, New York, N.Y.

[21] Appl. No.: 691,134

[22] Filed: May 28, 1976

[51] Int. Cl.² .............................................. C08G 18/04
[52] U.S. Cl. .......................... 260/859 R; 260/77.5 MA; 260/77.5 CR; 427/385 R
[58] Field of Search ................... 260/77.5 CR, 859 R, 260/77.5 MA; 427/385

[56] References Cited

U.S. PATENT DOCUMENTS

| | | | |
|---|---|---|---|
| 3,367,992 | 2/1968 | Bearden | 260/77.5 CR |
| 3,502,500 | 3/1970 | Hoock | 260/77.5 CR |
| 3,824,201 | 7/1974 | McGranaghon et al. | 260/77.5 CR |
| 3,837,892 | 9/1974 | Marzocchi | 260/77.5 CR |
| 3,855,379 | 12/1974 | Araki et al. | 260/77.5 CR |
| 3,856,757 | 12/1974 | Satomura | 260/77.5 CR |
| 3,878,036 | 4/1975 | Chang | 260/77.5 CR |
| 3,886,111 | 5/1975 | Yoshimura et al. | 260/77.5 CR |
| 3,966,681 | 6/1976 | Maeda et al. | 260/77.5 CR |
| 3,991,024 | 11/1976 | Nakamoto et al. | 260/77.5 CR |

OTHER PUBLICATIONS

"Polyurethanes Chemistry and Technology" Part II pp. 464-465 and 490-492, Saunders et al. 9/10/64, Interscience Publ., N.Y.

*Primary Examiner*—Eugene C. Rzucidlo
*Attorney, Agent, or Firm*—Jerry K. Mueller, Jr.

[57] ABSTRACT

A two-package urethane forming coating composition comprises a hydroxyl-bearing polymer having ethylenic unsaturation dispersed in fugitive solvent; and a multi-isocyanate dispersed in fugitive solvent. The coating composition cures by heating with an in situ reaction of the hydroxyl-isocyanate reaction in combination with an in situ free-radical addition polymerization through the ethylenic unsaturation.

15 Claims, No Drawings

HIGH SOLIDS URETHANE COATINGS

BACKGROUND OF THE INVENTION

This invention relates to urethane coatings, and more particularly to an improved high solids urethane coating composition.

Urethane coatings are useful in automotive and appliance applications. It is of advantage to provide such coating compositions with high solids content of, for example, 70% volume solids or greater. High solids coatings permit thinner wet films which have the same dry film thickness (solids) as conventional low solids formulations, and cure at low baking temperatures; however, low viscosity, low volatility, and controlled reactivity of high solids urethane coatings make their formulation difficult. Heretofore, high solids urethanes generally have been formulated from polyiscyanates reacted with polyols, but these polyurethanes invariably lack low viscosity and high molecular weight.

The present invention overcomes such prior problems by providing a high solids coating composition of low viscosity and higher molecular weight which cures to form an unusually good, tack-free, tough, flexible urethane film.

SUMMARY OF THE INVENTION

A two-package, urethane-forming coating composition curable upon heating to form a heat-cured urethane film, with comprises: said first package comprising a hydroxyl-bearing polymer having ethylenic unsaturation and having a molecular weight not substantially greater than about 3,000, and said polymer being dispersed in fugitive organic solvent; and said second package comprising a multi-isocyanate compound having a multiplicity of isocyanate groups and being dispersed in fugitive organic solvent, the total proportion of said fugitive solvents in both said packages being not substantially greater than about 30% by volume of said coating composition, the film of said coating composition curable upon heatng by in situ formation of urethane linkages by the hydroxyl-isocyanate reaction in combination with in situ free-radical addition polymerization through said ethylenic unsaturation of said polymer.

DETAILED DESCRIPTION OF THE INVENTION

The first package of the urethane-forming coating composition of the present invention comprises a hydroxyl-bearing polymer having ethylenic unsaturation (hydroxy urethane prepolymer) dispersed in fugitive solvent. Ethylenic unsaturation for present purposes comprehends a non-aromatic carbon-to-carbon double bond as typified by acrylics, allyl alcohols, unsaturated carboxylic acids and anhydrides thereof such as fumaric acid and maleic anhydride, derivatives of the foregoing and the like ethylenically unsaturated compounds. Ethylenic unsaturation may be contained in the polymer or monomer chain or in a side chain pendantly attached thereto.

The hydroxy urethane prepolymer can be a polyol or monomeric alcohol provided from a polyester, polyether, polyurethane, polysulfide, polyamide, and the like. The ethylenic unsaturation can be provided by the monomeric alcohol or polyol itself, or can be reacted onto a polyol or monomeric alcohol subsequently by conventional reaction schemes. Conventional reaction schemes react the monomeric alcohol or polyol with, for example, acrylic acids, acrylyl halides, acrylic-terminated ethers, acrylic or methacrylic anhydrides, isocyanate-terminated acrylates, epoxy acrylates, and the like. Further reaction schemes for formulating the hydroxy urethane prepolymer include reacting a hydroxy-acrylate monomer, hydroxy methacrylate monomer, or an allylether alcohol with a cyclic anhydride such as, for example, the anhydrides: maleic, phthalic, succinic, norborene, glutaric, and the like. The product unsaturated polyol-polyester optionally then can be reacted with a suitable oxirane compound, such as, for example, ethylene oxide, propylene oxide, glycidyl acrylate, allyl glycidyl ether, alpha-olefin epoxide, butyl glycidyl ether, and the like. Suitable allyl alcohols include, for example, trimethylolpropane monoallylether, trimethylolpropane diallylether, allyl hydroxypropylether and the like.

Additionally, conventional reaction schemes for producing the hydroxy urethane prepolymer include reacting alpha-aliphatic or aromatic substituted acrylic acids with an oxirane compound, and reacting a hydroxyacrylate or hydroxymethacrylate with a dimercaptan compound. Any of the foregoing also can be reacted further with a diisocyanate to produce a hydroxy urethane prepolymer having urethane linkages. Advantageously, the hydroxy urethane prepolymer has a molecular weight not substantially above about 3,000 for maintaining good application viscosity of the urethane-forming coating composition of this invention. While the urethane prepolymer can be mono-hydroxy only, the prepolymer can contain two or more hydroxyl groups and be a polyol urethane prepolymer.

The second package of the urethane-forming coating composition of the present invention comprises a multi-isocyanate compound having a multiplicity of isocyanate groups dispersed in fugitive organic solvent. Referring to the multi-isocyanate compound, such compound can be alkyl, aryl, alkyl-aryl, or polymeric multi-isocyanate compound having a multiplicity of isocyanate groups. Representative multi-isocyanate compounds include toluene diisocyanate, methylenediisocyanate, trimethylhexamethylene diisocyanate, and the like. Though not necessary, for economy and efficiency it is preferred that the overall ratio of hydroxyl groups on the polyol urethane prepolymer and isocyanate groups on the multi-isocyanate be about one.

Further, both packages contain fugitive solvent in a proportion which will provide the present coating composition (comprising packages one and two) with volume solids of at least about 70%. Suitable fugitive organic solvents include aliphatic and aromatic hydrocarbons, ketones, esters, ethers and amides, such as, for example, ethylacetate, cellosolve acetate, xylene, toluene, methylethyl ketone, and the like.

If desired, a portion of the solvent of package one can be replaced with an ethylenically unsaturated diluent (solvent) reactive with the ethylenic unsaturation of the hydroxy urethane prepolymer. The ethylenically unsaturated diluent normally is liquid at room and higher temperatures under which the present coating composition is formulated, stored, and applied. The ethylenic unsaturation of such diluent is defined above. Typical ethylenically unsaturated diluents can be selected from the group consisting of acrylic compounds and allyl compounds and include hydroxyethylacrylate, methylacrylate, methylethylacrylate, and like acrylic compounds; monoallylether, allyl glycidyl ether, trimethylolpropane-monoallyl ether, propylene glycol monoallyl ether, pentapropylene glycol monoallyl ether, and like allyl compounds.

A portion of the organic solvent in package two can be replaced with a non-hydroxyl bearing ethylenically unsaturated diluent (solvent) to form the second package; and to prevent premature gellation thereof, the diluent is non-hydroxyl bearing in this second package. Ethylenic unsaturation of the non-hydroxyl bearing diluent is above defined and the non-hydroxyl bearing ethylenically unsaturated diluent can be selected from acrylic compounds, allyl compounds, combinations thereof and the like.

Suitable catalysts advantageously are included in either one or both packages for promoting the isocyanate-hydroxyl reaction by which urethane linkages in the coated film are formed. Such catalysts include dibutyl tin dilaurate, tertiary amines such as triethylene diamine, N-methylmorpholine, and like catalysts. Also, either one or both of the packages can contain free-radical polymerization-promoting catalysts such as benzoyl peroxide, methylethylketone peroxide, and the like, or metal catalysts (driers) such as cobalt and the like. The free-radical polymerization reaction for which these catalysts are included will be described in detail below.

The coating composition cures in a unique dual in situ reaction scheme. One reaction occurring in the applied film coating is the formation of urethane linkages (polyurethane polymer) by the in situ reaction of the hydroxyl group of the prepolymer with the isocyanate component. Complete curing of the coating involves a second reaction which is the self-cross-linking of the in situ formed polyurethane polymer by free-radical addition polymerization reaction though the ethylenic unsaturation of the in situ formed polyurethane polymer. Additionally, when reactive solvent forms a portion of the coating composition, such solvents additionally participate in this free-radical addition polymerization cure. While it is believed that the polyurethane polymer is first formed in the film and then cross-linked by free-radical addition polymerization, the two curing reactions may occur in the reverse order or simultaneously occur. The order of occurrence of the reactions is not critical to the present invention. That the two reactions do occur in the applied film is sufficient for present purposes.

The proportion of solvent in each of the two packages and reactive diluent, if any, is in such amount to provide the coating composition (the combination of the two packages) with a viscosity not substantially greater than about 500 centipoises at application temperature (preferably room temperature, though the application temperature can range up to 120°–140° F. or higher), advantageously between about 50 and 500 centipoises, and preferably between about 100 and 200 centipoises. Of course, higher temperatures of the coating composition at application allow higher solids content of the coating composition while retaining the requisite viscosity for good application.

The two packages generally are combined just prior to application of the coating composition though dual spray or the like of the two-packages onto the substrate can be practiced. The present coating composition is applied to metal substrates preferably, by conventional techniques such as brushing, dipping, spraying, rolling, and the like. The applied film of the present coating composition can cure at room temperature, though baking temperatures of, for example, up to about 400° F., or higher generally are preferred. The present coating composition also can contain opacifying pigments and inert extenders, such as, for example, titanium dioxide, zinc oxide, clays such as kaolinite, silica, talc, and the like.

The following examples show in detail how the present invention can be practiced, but should not be construed as limiting the invention.

EXAMPLE 1

The hydroxy urethane prepolymer, a polyester polymer having pendant hydroxyl and pendant ethelenically unsaturated carbonyl functionality, was synthesized by reacting hydroxyethylacrylate with phthalic anhydride at 110° C. in the presence of toluene hydroquinone followed by the addition of propylene oxide to obtain an acid number of less than 10 in the presence of a lithium carbonate catalyst. This polyester had a molecular weight of 322, acid number of 7.3, a non-volatile solids content of 89%, and a Gardner-Holt viscosity of W. The hydroxyl equivalent of this polyester was about 322.

The multifunctional isocyanate resin was Desmondur N-100 (NCO equivalent weight of 195) which is an aliphatic triisocyanate. The coating composition was formulated from 322 grams of the hydroxyl functional, acrylate functional polyester and 195 grams of the triisocyanate dispersed in 75 grams of ethylacetate. Five grams of benzoyl peroxide catalyst and 0.05 grams of dibutyl tin dilaurate catalyst also were added to the system. This clear coating composition of 75% volume solids was applied to a cold rolled steel panel to a 1 mil film thickness and baked for 20 minutes at 250° F. The applied coating cured by the dual reactions above described.

The cured coating was high performance polyurethane coating ideally suited for appliance finishes.

EXAMPLE 2

The urethane prepolymer was polyether monomer with a hydroxy equivalent weight of about 380 represented by the following structure:

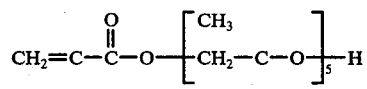

Thirty-eight grams of this polyether, 19 grams of the Desmodur N aliphatic triisocyanate (NCO equivalent of 190) and 1.02 grams of benzoyl peroxide catalyst were dispersed in 11 grams of xylene solvent. This dispersion had a viscosity of B+ (Gardner-Holt Bubbles Tube).

The coating composition was drawn down on a panel of cold rolled steel to a 1 mil film thickness and baked at 250° F. for 20 minutes. 81% weight solids of the coating composition was retained on the panel. The coating possessed a 50 inch/pound reverse impact resistance, had a pencil hardness of F, and displayed exceptional methylethyl ketone solvent resistance.

EXAMPLE 3

The coating composition was formulated from 19 grams of the polyether of Example 2, 16 grams of an unsaturated dihydroxy polyester with hydroxyl equivalent of 320, and 4.8 grams of the aliphatic triisocyanate of Example 2, and dispersed in 4.8 grams of hydroxyethylacrylate and 9.5 grams of xylene with 1.02 grams of benzoyl peroxide catalyst. This composition had a Gardner-Holt Bubbles Tube viscosity of J.

The composition was drawn down on a panel of cold rolled steel to a 1 mil thickness and baked at 250° F. for 20 minutes to give a polyurethane coating of 80 percent weight solids after baking with a pencil hardness of F to 2H, a 60 inch/pound reverse impact resistance, and 100 rubs methylethylketone solvent resistance.

EXAMPLE 4-17

Several urethane-forming coating compositions were formulated, applied to steel panels, cured, and evaluated for performance. Curing temperatures of the coating ranged from 200° to 300° F., and film thicknesses ranged from about .5 to about 1.5 mils. The multi-isocyanate (75% weight solids in xylene. Compound of package two was Desmodur N-100 of Example 1 for each coating formulation. Packages one and two were combined and the proportions of each adjusted to obtain coating compositions of 70% to 80% volume solids for each composition.

The ingredients of the hydroxy urethane-forming prepolymer for each formulation and the performance results of the cured coating are tabulated below.

| Package One Ingredients For Hydroxy Urethane Prepolymer* | Molar Ratio Of Ingredients | Viscosity (Gardener-Holt Bubbles Tube) | Percent Weight Solids Of Prepolymer In Unreacted Monomers | Pencil Hardness | No. Of Methyl Ethyl Ketone Rubs | Direct Impact Resistance (inch/pounds) |
|---|---|---|---|---|---|---|
| HPMA-MA-PO | 1-1-1 | K | 79.0 | 2H | 150 | 100 |
| HPMA-PA-PO | 1-1-1 | Z− | 90.0 | 3H | 200 | 20 |
| HPA-MA-PO | 1-1-1 | V | 84.8 | F | 40 | 70 |
| HPMA-MA-EO | 1-1-1 | B | 71.3 | 3H | 200 | 160 |
| HPMA-MA-PO | 1-1.5-1.5 | X | 91.8 | H | 200 | 40 |
| HPMA-MA-NPG | 1-1-1 | O+ | 80.6 | H | 200 | 160 |
| AA-PO-MA-PO | 1-1-1-1 | D | — | 3B | 100 | 140 |
| AA-PO-MA-PO | 1-5-1-1 | J | 86.6 | 3B | 70 | — |
| AA-PO-THPA-PO | 1-1-1-1 | E | 77.2 | 3B | 11 | 50 |
| TMPMAE-THPA-PO | 1-2-2 | $Z_8$ | 99.4 | F | 80 | 160 |
| HEA-THPA-PO | 1-1-1 | V− | 86.9 | | | |
| HEA-THPA-NPG | 1-1-1 | $Z_5$ | 93.4 | H | 200 | 160 |
| TMPDAE-MA-GA | 1-1-1 | W | 87.0 | 2H | 200 | 20 |
| TMPDAE-THPA-GA | 1-1-1 | X | 90.3 | H | 200 | 4 |

*KEY FOR ABBREVIATIONS OF INGREDIENTS:
TMPAME = Trimethylolpropanemonoallylether
TMPDEA = Trimethylolpropanediallylether
PO = Propylene Oxide
MA = Maleic Anhydride
PA = Phthalic Anhydride
EO = Ethylene Oxide
THPA = Tetrahydrophthalic Anhydride
GA = Glycidyl Acrylate
HPMA = Hydroxypropylmethacrylate
HPA = Hydroxypropylacrylate
HEA = Hydroxyethylacrylate
AA = Allyl Alcohol
NPG = Neopentyl Glycol

We claim:

1. A two-package, urethane-forming coating composition formulated by combining said two packages, an applied film of said coating composition being curable upon heating to form a heat-cured urethane film, which comprises:
said first package comprising a hydroxyl-bearing polymer having ethylenic unsaturation and having a molecular weight not substantially greater than about 3,000, and said polymer being dispersed in fugitive organic solvent; and
said second package comprising a multi-isocyanate compound having a multiplicity of isocyanate groups and being dispersed in fugitive organic solvent,
the total proportion of said fugitive solvents in both said packages being not substantially greater than about 30% by volume of said coating composition, said applied film of said coating composition curable upon heating by in situ formation of urethane linkages by the hydroxyl-isocyanate reaction in combination with in situ free-radical addition polymerization through said ethylenic unsaturation of said polymer.

2. The coating composition of claim 1 wherein said hydroxyl-bearing polymer is a polyol-bearing polymer.

3. The coating composition of claim 1 wherein a portion of said fugitive solvent of package one is replaced with an ethlenically unsaturated diluent reactive with said ethylenic unsaturation of said hydroxyl-bearing polymer and at least a portion of said diluent cures into said film upon heating.

4. The coating composition of claim 3 wherein said ethylenically unsaturated diluent is an acrylic and/or allyl functional diluent.

5. The coating composition of claim 1 wherein a portion of said fugitive solvent of package two is replaced with a non-hydroxyl-bearing ethylenically unsaturated diluent reactive with said ethylenic unsaturation of said hydroxyl-bearing polymer and at least a portion of said diluent cures into said film upon heating.

6. The coating composition of claim 5 wherein said non-hydroxyl-bearing ethylenically unsaturated diluent is an acrylic and/or allyl functional diluent.

7. The coating composition of claim 1 wherein the total of said fugitive solvent in said coating composition is sufficient so that the viscosity of said coating composition is not substantially greater than about 500 centipoises.

8. The coating composition of claim 7 wherein said viscosity is between about 50 and about 500 centipoises.

9. The coating composition of claim 8 wherein said viscosity is between about 100 and about 200 centipoises.

10. A substrate having the coating composition of claim 1 coated thereon as a film and said film having been heat cured.

11. A process for coating a substrate with a film of a two-package heat-curable, urethane-forming coating composition which comprises:

applying said coating composition to said substrate, said coating composition comprising: a first package of a hydroxyl-bearing polymer having ethylenic unsaturation and having a molecular weight not substantially greater than about 3,000, said polymer being dispersed in fugitive organic solvent; and a second package of a multi-isocyanate compound having a multiplicity of isocyanate groups and being dispersed in fugitive organic solvent, the total proportion of said fugitive solvents being not substantially greater than about 30% by volume of said coating composition; and heating said coated substrate to cure said film of said coating composition by in situ formation of urethane linkages by the hydroxyl-isocyanate reaction in combination with in situ free-radical addition polymerization through said ethylenic unsaturation of said polymer.

12. The process of claim 1 wherein the total proportion of said fugitive solvent is sufficient so that the viscosity of said coating composition is not substantially greater than about 500 centipoises.

13. The process of claim 11 wherein said coated substrate is heated at a temperature of not substantially greater than about 400° F. to cure said coating.

14. The process of claim 11 wherein a portion of said fugitive solvent of said package one is replaced with an ethylenically unsaturated diluent reactive with said ethylenic unsaturation of said polymer and at least a portion of said diluent cures into said film of said coating composition by said heating.

15. The process of claim 11 wherein a portion of said fugitive solvent of said package two is replaced with a non-hydroxyl-bearing ethylenically unsaturated diluent reactive with said ethylenic unsaturation of said polymer and at least a portion of said diluent cures into said film of said coating composition by said heating.

* * * * *

UNITED STATES PATENT OFFICE
CERTIFICATE OF CORRECTION

Patent No. 4,064,194         Dated   December 20, 1977

Inventor(s)   James M. Evans et al.

It is certified that error appears in the above-identified patent and that said Letters Patent are hereby corrected as shown below:

Column 5, line 5, after the word "mil" insert -- film --.

Column 8, line 3, "claim 1" should read -- claim 11 --.

Signed and Sealed this

Thirtieth Day of May 1978

[SEAL]

Attest:

RUTH C. MASON
Attesting Officer

LUTRELLE F. PARKER
Acting Commissioner of Patents and Trademarks